(12) United States Patent
Rezaei et al.

(10) Patent No.: US 12,412,403 B2
(45) Date of Patent: Sep. 9, 2025

(54) BOUNDARY ESTIMATION

(71) Applicant: QUALCOMM Incorporated, San Diego, CA (US)

(72) Inventors: Behnaz Rezaei, San Diego, CA (US); Christopher Brunner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 17/680,114

(22) Filed: Feb. 24, 2022

(65) Prior Publication Data

US 2023/0215190 A1    Jul. 6, 2023

Related U.S. Application Data

(60) Provisional application No. 63/266,312, filed on Dec. 31, 2021.

(51) Int. Cl.
| | |
|---|---|
| G06K 9/00 | (2022.01) |
| G01S 17/89 | (2020.01) |
| G06V 10/77 | (2022.01) |
| G06V 10/82 | (2022.01) |
| G06V 20/56 | (2022.01) |

(52) U.S. Cl.
CPC ............ G06V 20/588 (2022.01); G01S 17/89 (2013.01); G06V 10/7715 (2022.01); G06V 10/82 (2022.01)

(58) Field of Classification Search
None
See application file for complete search history.

(56) References Cited

U.S. PATENT DOCUMENTS

| | | | |
|---|---|---|---|
| 2019/0147253 A1 | 5/2019 | Bai et al. | |
| 2019/0384304 A1* | 12/2019 | Towal | G05D 1/0221 |
| 2020/0160559 A1* | 5/2020 | Urtasun | G06V 20/58 |
| 2021/0063200 A1 | 3/2021 | Kroepfl et al. | |
| 2021/0323572 A1 | 10/2021 | He et al. | |

(Continued)

FOREIGN PATENT DOCUMENTS

EP    3907472 A1    11/2021

OTHER PUBLICATIONS

Bai M., et al., "Deep Multi-Sensor Lane Detection", arxiv.org, Cornell University Library, 201 Olin Library Cornell University Ithaca, NY 14853, May 4, 2019, XP081272350, 8 pages, Section III.

(Continued)

*Primary Examiner* — Wei Wen Yang
(74) *Attorney, Agent, or Firm* — QUALCOMM Incorporated

(57) ABSTRACT

Certain aspects are directed to an apparatus for lane estimation. The apparatus generally includes: at least one memory; and at least one processor coupled to the at least one memory and configured to receive a first input associated with a three-dimensional (3D) space, extract, from the first input, a first set of points associated with a ground plane of the 3D space, map each of the first set of points to a region of a plurality of regions of a two-dimensional (2D) frame, determine one or more attributes associated with each region of the plurality of regions based on one or more of the first set of points mapped to the region, and identify one or more road lanes based on the one or more attributes.

30 Claims, 8 Drawing Sheets

(56) References Cited

U.S. PATENT DOCUMENTS

| | | | |
|---|---|---|---|
| 2021/0326607 A1 | 10/2021 | Bai et al. | |
| 2022/0180578 A1* | 6/2022 | Peterson | G06T 11/206 |
| 2023/0049383 A1* | 2/2023 | Lehtimäki | G06V 20/588 |

OTHER PUBLICATIONS

Homayounfar N., et al., "DAGMapper: Learning to Map by Discovering Lane Topology", 2019 IEEE/CVF International Conference on Computer Vision (ICCV), Oct. 27, 2019, XP033723638, pp. 2911-2920, Section 3.

International Search Report and Written Opinion—PCT/US2022/082190—ISA/EPO—Apr. 18, 2023.

Li Q., et al., "HDMapNet: A Local Semantic Map Learning and Evaluation Framework", arxiv.org, Cornell University Library, 201 Olin Library Cornell University Ithaca, NY 14853, Oct. 24, 2021, XP091067344, 7 pages, Section III.

Zurn J., et al., "Lane Graph Estimation for Scene Understanding in Urban Driving", IEEE Robotics and Automation Letters, vol. 6, No. 4, Sep. 9, 2021, XP011880640, pp. 8615-8622, Section III.

* cited by examiner

BOUNDARY ESTIMATION

CROSS REFERENCE TO RELATED APPLICATION

This application claims the benefit of priority to U.S. provisional application No. 63/266,312, filed on Dec. 31, 2021, which is incorporated by reference herein in its entirety as if fully set forth herein.

FIELD

The present disclosure generally relates to performing boundary estimation. Some aspects of the present disclosure include systems and techniques for a sensor-based (e.g., light detection and ranging (LiDAR)-based) three-dimensional (3D) boundary estimation (e.g., lane boundary estimation or boundaries of other objects).

BACKGROUND

Object detection techniques may be used to detect one or more objects in a scene. For example, object detection can be used to detect or identify one or more positions and/or locations of markings in an environment. Examples of fields where a device may determine the position and/or location of markings include autonomous driving by autonomous driving systems (e.g., of autonomous vehicles), autonomous navigation by a robotic system (e.g., an automated vacuum cleaner, an automated surgical device, etc.), among others. For instance, a three-dimensional (3D) environment may include markings to facilitate navigation through the environment, such as road lanes. It can be important for the autonomous device to detect such markings and accurately navigate the space relative to such markings.

Using autonomous driving systems as an example, an important feature for autonomous driving is the ability of an autonomous vehicle to detect lanes on a road and to accurately determine the extent of the drivable space on the road. For instance, some lanes on a road can be faded or partly obscured, making identification of such lanes difficult. Lane detection techniques may be used to detect or identify lanes on a road to facilitate various autonomous tasks. In some fields, positions of lanes in an environment may be determined so that an autonomous device can accurately navigate through the environment (e.g., to make accurate motion planning and trajectory planning decisions). Systems and techniques are needed for reliably tracking markings (e.g., road lanes) to facilitate navigation by an autonomous device.

SUMMARY

Certain aspects of the present application are directed to systems and techniques for boundary estimation. For example, certain aspects are directed to lane boundary estimation. The apparatus generally includes: at least one memory; and at least one processor coupled to the at least one memory and configured to: receive a first input associated with a three-dimensional (3D) space; extract, from the first input, a first set of points associated with a ground plane of the 3D space; map each of the first set of points to a region of a plurality of regions of a two-dimensional (2D) frame; determine one or more attributes associated with each region of the plurality of regions based on one or more of the first set of points mapped to the region; and identify one or more road lanes based on the one or more attributes.

Certain aspects are directed to a method for lane estimation. The method generally includes: receiving a first input associated with a three-dimensional (3D) space; extracting, from the first input, a first set of points associated with a ground plane of the 3D space; mapping each of the first set of points to a region of a plurality of regions of a two-dimensional (2D) frame; determining one or more attributes associated with each region of the plurality of regions based on one or more of the first set of points mapped to the region; and identifying one or more road lanes based on the one or more attributes.

Certain aspects are directed to an apparatus for lane estimation. The apparatus generally includes: means for receiving a first input associated with a three-dimensional (3D) space; means for extracting, from the first input, a first set of points associated with a ground plane of the 3D space; means for mapping each of the first set of points to a region of a plurality of regions of a two-dimensional (2D) frame; means for determining one or more attributes associated with each region of the plurality of regions based on one or more of the first set of points mapped to the region; and means for identifying one or more road lanes based on the one or more attributes.

Certain aspects are directed to a non-transitory computer-readable medium having instructions stored thereon, that when executed by a processor, causes the processor to: receive a first input associated with a three-dimensional (3D) space; extract, from the first input, a first set of points associated with a ground plane of the 3D space; map each of the first set of points to a region of a plurality of regions of a two-dimensional (2D) frame; determine one or more attributes associated with each region of the plurality of regions based on one or more of the first set of points mapped to the region; and identify one or more road lanes based on the one or more attributes.

In some aspects, the computing device and/or apparatus is, is part of, and/or includes a vehicle or a computing device or component of a vehicle (e.g., an autonomous vehicle), a robotics device or system or a computing device or component of a robotics device or system, a personal computer, a laptop computer, a server computer, a camera, or other device. In some aspects, the computing device, apparatuses, and/or vehicle includes a camera or multiple cameras for capturing one or more images or any other sensors for capturing environment data. In some aspects, the computing device, apparatuses, and/or vehicle further includes a display for displaying one or more images, notifications, and/or other displayable data. In some aspects, the computing device, apparatuses, and/or vehicle described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1A:
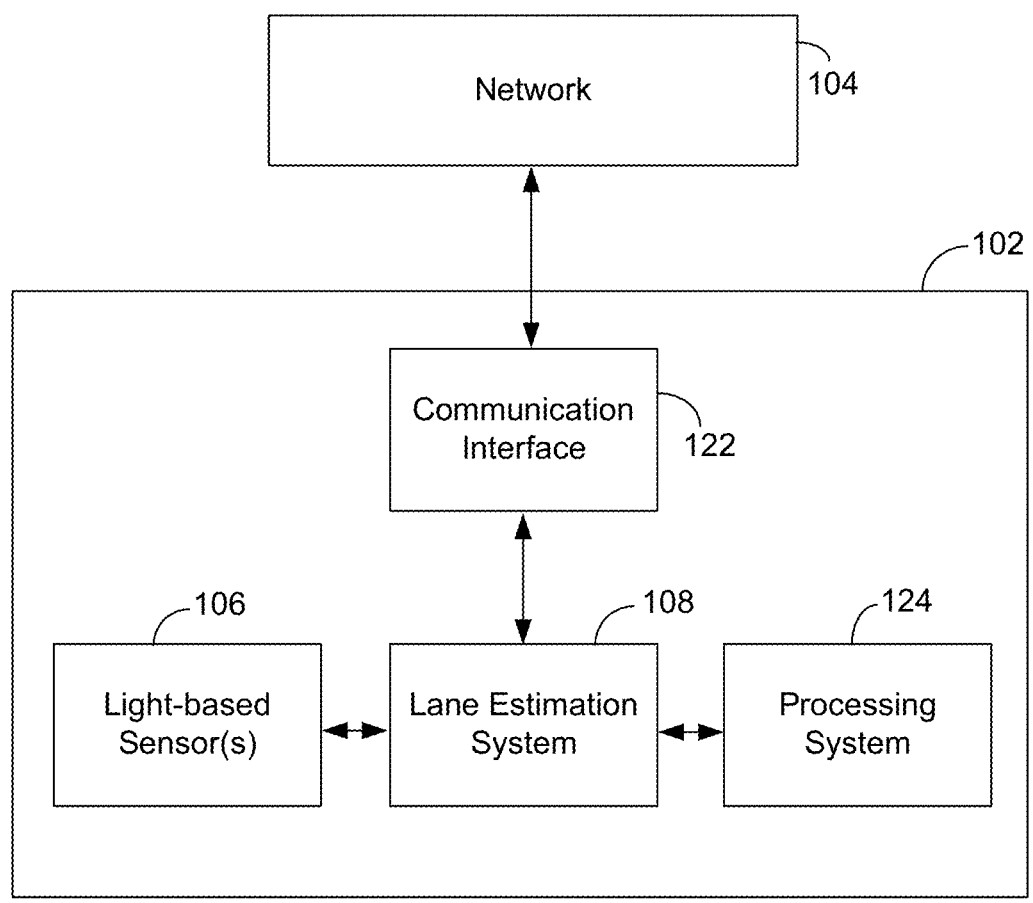
FIG. 1A illustrates a computing device having a lane estimation system, in accordance with certain aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, a system or device may determine positions and/or locations of markings in an environment. In some illustrative examples, autonomous systems or devices (e.g., autonomous driving systems of autonomous vehicles, autonomous driving systems of robotics systems, among others) may detect markings (e.g., road lanes or other navigational markings) in a three-dimensional (3D) environment to facilitate navigation through the environment. It can be important for an autonomous device or system to detect such markings and accurately navigate the space relative to such markings.

Using autonomous driving systems as an illustrative example, an important goal of such systems is the ability of an autonomous vehicle to detect lanes on a driving surface and to accurately determine the extent of the drivable space on the road relative to the detected lanes. The ability to detect and track lanes can be especially important for higher levels of autonomy, such as autonomy levels 3 and higher. For example, autonomy level 0 involves full control from the driver as the vehicle has no autonomous driving system, and autonomy level 1 involves basic assistance features, such as cruise control, in which case the driver of the vehicle is in full control of the vehicle. Autonomy level 2 refers to semi-autonomous driving, where the vehicle can perform functions such as drive in a straight path, stay in a particular lane, control the distance from other vehicles in front of the vehicle, or other functions. Autonomy levels 3, 4, and 5 include more autonomy than levels 1 and 2. For example, autonomy level 3 refers to an on-board autonomous driving system that can take over all driving functions in certain situations, where the driver remains ready to take over at any time if needed. Autonomy level 4 refers to a fully autonomous experience without relying on a user's help, even in complicated driving situations (e.g., on highways and in heavy city traffic). With autonomy level 4, a person may still remain in the driver's seat behind the steering wheel. Vehicles operating at autonomy level 4 can communicate and inform other vehicles about upcoming maneuvers (e.g., a vehicle is changing lanes, making a turn, stopping, etc.). Autonomy level 5 vehicles are fully autonomous, self-driving vehicles that operate autonomously in all conditions. A human operator is not needed for the vehicle to take any action.

Lane markers are important landmarks for the orientation of autonomous vehicles in traffic situations. Lane markers separate roads from the non-drivable environment and partly determine driving rules. Automatic generation of street maps is another important application for lane marker detection. The lane detection technique, which is applied in either generating highly automated driving (HAD) map data or providing location information for a vehicle during driving, has gained increasing interest recently. Lane detection techniques are widely explored in multiple vehicle safety systems, such as lane departure warning systems (LDWS) and advanced driver assistance systems (ADAS). Alternatively, localization on a prior map, usually known as map-based localization or map-matching, has gained interest since maps can be pre-built accurately. To this end, an important step to assess traffic situations is proper detection and mapping of lanes and intersections. However, poor quality lines, sharp curves, irregular lane shapes, emerging and merging lanes, writings, other markings on the road (e.g., pedestrian crosswalks) and different pavement materials make the detection of lane markings challenging.

In some implementations, a lane estimation system may use information from a light detection and ranging (LiDAR) sensor to identify various attributes of a road to facilitate autonomous driving. For example, LiDAR sensor data may be used to identify lanes on the road, allowing an autonomous vehicle to keep within a boundary set by road lanes. LiDAR is a method for determining ranges by targeting an object with a light source (e.g., a laser) and measuring the time for the reflected light to return to a receiver. The output of a LiDAR sensor may be LiDAR point cloud, a set of points, each associated with information such as 3D coordinates (x, y, and z dimensions) and reflectivity (e.g., indicating an intensity of the reflected light).

An example of lane estimation implementations using a LiDAR point cloud include filtering, thresholding, and line fitting using techniques such as Hough or random sample consensus (RANSAC) in which a fixed number of lanes are assumed to exist in the sensor's field of view. Current lane estimation techniques using LiDAR may not identify attributes such as lane type (e.g., dashed line or solid line) or lane identifier. Some current LiDAR lane estimation techniques are designed based on priors (e.g., preset information) such as parallel lane markings or fixed number of lanes which may not always be true (e.g., in merge and emerge cases), adversely impacting lane estimation accuracy. Further, these techniques involve manually adjusting thresholding and filtering parameters to improve performance in different scenarios. Thus, current LiDAR lane estimation techniques may be unreliable and unable to handle complexities such as faded lane markings, merging, and emerging lanes.

Systems, apparatuses, processes (or processes), and computer-readable media (referred to collectively as "systems and techniques") are described herein for performing lane estimation (e.g., using deep neural networks) based on light-based inputs, such as LiDAR inputs or other time-of-flight (ToF) based inputs, structured light inputs, any combination thereof, and/or other light-based inputs. While specific examples are described herein using LiDAR as an example of such light-based inputs, the systems and techniques can be performed using any other type of light-based inputs, including but not limited to time-of-flight (ToF) based inputs, structured light inputs, and/or other light-based inputs, any combination thereof, and/or other light-based inputs.

Aspects of the present disclosure may be implemented without prior assumption of lane geometry and can handle faded lane markings without manual tuning of parameters. For example, a lane estimation system may receive, from a LiDAR sensor, a LiDAR point cloud for a three-dimensional (3D) environment (also referred to as a 3D space). From the LiDAR point cloud, a subset of points may be extracted, allowing for a more efficient lane estimation process. Various techniques for extracting ground points that are important for lane estimation are described herein. As one example, the subset of points may include points that are on or close to a ground plane.

The lane estimation system may then map the extracted ground points to respective regions of a two-dimensional (2D) frame, such as a birds-eye-view (BEV) frame from a BEV perspective. For example, one or more of the extracted ground points may be mapped to each region of a BEV frame or other 2D frame. For each region of the BEV frame or other 2D frame, a set of features (or attributes) associated with the points mapped to the region may be calculated and used to perform lane estimation. In some examples, a trained machine learning model may receive the calculated set of features and identify road lanes in the 3D environment based on the calculated set of features.

While certain examples provided herein are described with respect to autonomous driving to facilitate understanding, other types of systems can also benefit from detecting or tracking lanes. For instance, robotics systems that perform various operations may detect and track lanes for navigation. In one illustrative example, a robotics device used for cleaning (e.g., an autonomous vacuum cleaner) may detect the presence and location of lanes in an environment that are marked for the robotics device to avoid objects when moving through the environment. In another illustrative example, a robotics device used for manufacturing may need to know an accurate location of lanes in an environment to avoid accidents. Many other examples exist of systems that need to be able to identify lanes or various markings in an environment to facilitate autonomous tasks.

FIG. 1A illustrates a computing device 102 having a lane estimation system 108 in accordance with certain aspects of the present disclosure. As shown, computing device 102 may include one or more light-based sensors 105 that can provide a light-based output that can be used as inputs to the lane estimation system 108. In some aspects, the one or more light-based sensors 105 can include a LiDAR sensor configured to generate a LiDAR point cloud. In some aspects, the one or more light-based sensors 105 may additionally or alternatively include one or more other types of time-of-flight (ToF) based sensors, one or more structured light sensors, any combination thereof, and/or other light-based sensors. Using LiDAR as an illustrative example, the LiDAR point cloud output by the LiDAR sensor may be used as a LiDAR input to the lane estimation system 108.

In some aspects, computing device 102 may also include a communication interface 122 that facilitates communication with a network 104. The communication interface 122 may receive information, such as a two-dimensional (2D) frame (e.g., a birds-eye-view (BEV) frame from a BEV perspective), which may be provided to lane estimation system 108. In some examples, the computer device 102 may generate the information, such as the 2D frame (e.g., the BEV frame).

Using the light-based input (e.g., the LiDAR input) and the 2D frame (e.g., the BEV frame), the lane estimation system 108 may detect one or more lanes (e.g., on a road). In some aspects, the lane estimation system 108 may detect a type of the lane such as whether the lane is a dashed line or a solid line. In some aspects, the computing device 102 may also include a processing system 124. The processing system 124 may receive the lane detection output from the lane estimation system 108 for further processing. For example, the processing system 124 may process the lane detection output to control an autonomous task, such as to perform an autonomous driving operation for an autonomous vehicle. In some aspects, lane estimation system 108 and processing system 124 may be implemented as part of a same processor (e.g., a central processing unit (CPU), a digital signal processor (DSP), a neural processing unit (NPU), a general purpose microprocessor, an application specific integrated circuit (ASIC), a field programmable logic array (FPGA), any combination thereof, or other processor).

Figure 1B:
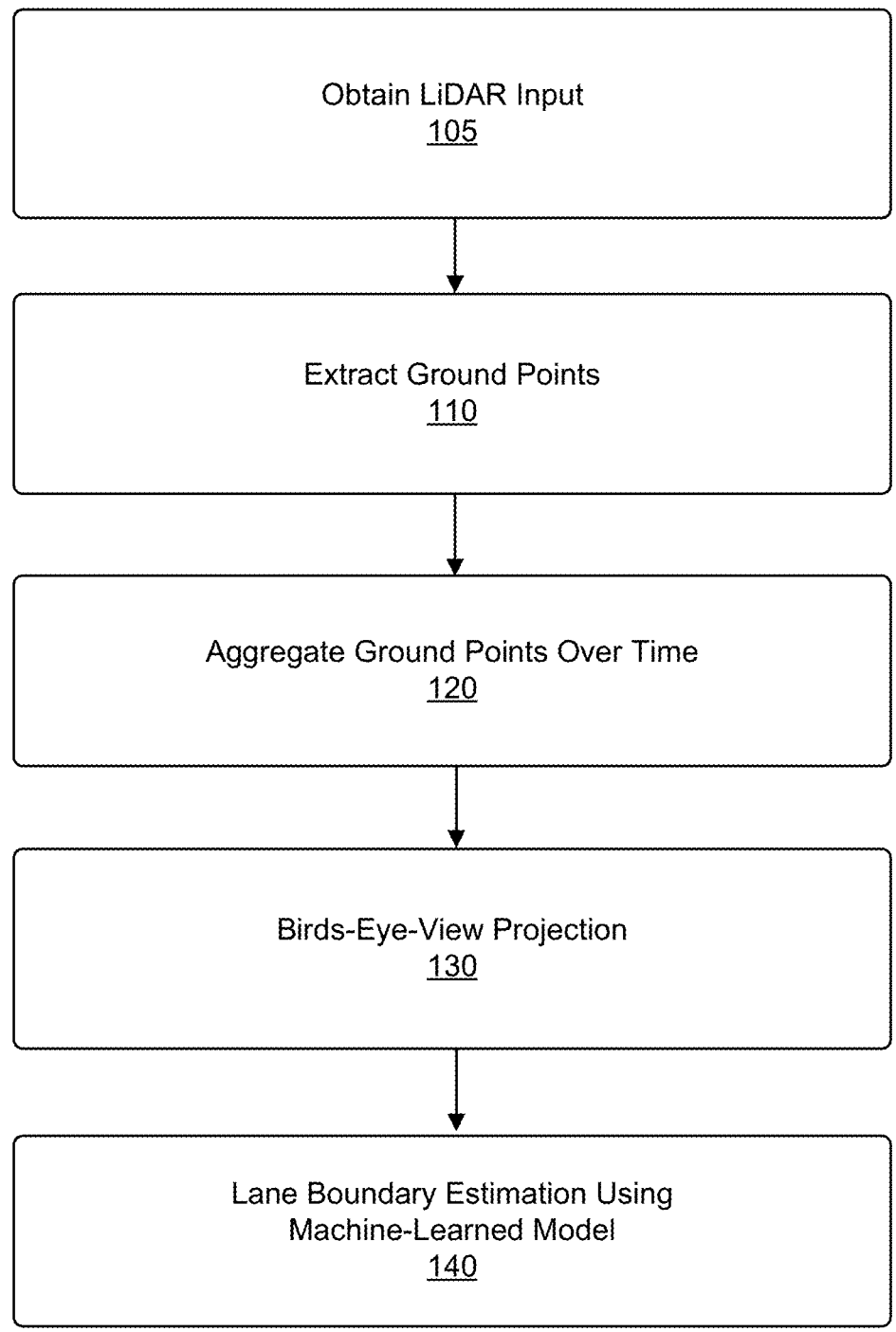
FIG. 1B is a flow diagram illustrating an example process for lane estimation, in accordance with certain aspects of the present disclosure.

FIG. 1B is a flow diagram illustrating an example process for lane estimation, in accordance with certain aspects of the present disclosure. The operations of process 100 may be performed by a lane estimation system (e.g., lane estimation system 108) or a component thereof, such as the processor 710, and in some aspects, the storage device 730.

At block 105, the lane estimation system can obtain a LiDAR input. LiDAR is a remote sensing technique that uses light in the form of a pulsed laser to measure ranges (variable distances) to various points in a 3D environment. The LiDAR input may provide information regarding an area, including a road and surrounding road regions. The LiDAR output may include a LiDAR point cloud, each point being associated with 3D coordinates and a reflectivity (r), as described in more detail with respect to FIG. 2. As noted above, light-based inputs other than or in additional LiDAR data may also be obtained and used by the process 100, such as ToF data, structured-light data, etc.

Figure 2:
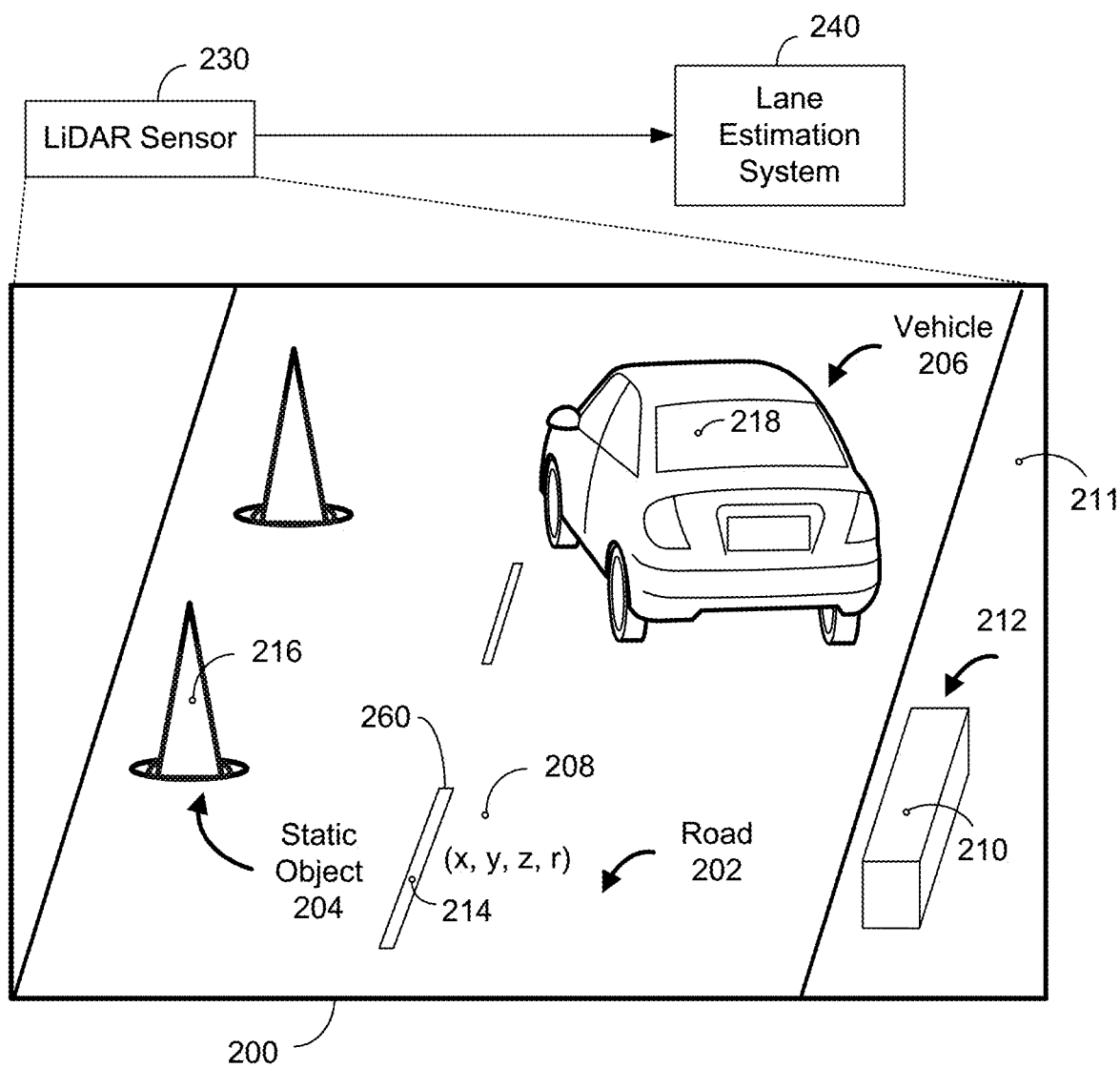
FIG. 2 illustrates a scene including road lanes to be identified, in accordance with certain aspects of the present disclosure.

FIG. 2 illustrates a scene 200 including a road 202 having lanes (e.g., lane 260), static objects (e.g., static object 204 or static object 212), and a vehicle 206 driving on the road 202. In some cases, the scene 200 can be captured by a tracking vehicle (not shown). A LiDAR sensor 230 may capture information (e.g., a LiDAR point cloud) regarding the scene 200, and provide the information to a lane estimation system 108 for processing. The LiDAR sensor may be provided from any suitable source, such as a vehicle.

The LiDAR sensor may generate the LiDAR point cloud providing information regarding points on the scene 200. Some example points 208, 210, 211, 214, 216, 218 of the LiDAR point cloud are shown in FIG. 2, although the LiDAR point cloud may include many more points not shown in scene 200. Each point may be associated with x, y, and z dimensions (e.g., indicating 3D coordinates of the point) and reflectivity (r). The reflectivity indicates an intensity associated with light reflection from the LiDAR point. The reflectivity may indicate various attributes with respect to the LiDAR point, such as surface characteristics. Some points (e.g., point 214) may be on a road lane 260, some points (e.g., point 208) may be on an area of the road that is external to any lane markings, some points (e.g., points 210, 211) may be outside the road 202, and some points (e.g., point 216) may be on static objects (e.g., object 204), and some points (e.g., point 218) may be on vehicles (e.g., vehicle 206).

Referring back to FIG. 1B, at block 110, the lane estimation system can extract ground points from the LiDAR input (e.g., extract a subset of the LiDAR point cloud). Since lane markers are expected to occur on the road surface or at their borders, various points associated with lasers from the LiDAR sensor are considered as being important for lane estimation and extracted for further processing. For example, a subset (also referred to as ground points) of the LiDAR point cloud are extracted to reduce the number of points that have to be processed (e.g., aggregated) during the detection process. The extraction of the LiDAR ground points also facilitates avoidance of any occlusion that may happen after an aggregation process by moving objects (e.g., a vehicle) on the road. The extracted ground points may be points of the LiDAR input at or near the ground plane. The extraction of the ground points may be performed using any plane segmentation technique.

In some cases, ground points may be extracted in order to exclude points representing objects (e.g., moving or stationary objects) on the road, although not all points on objects may be excluded when extracting ground points. For example, LiDAR point 210 may be on an object 212 (e.g., construction object) and may be excluded from extraction as a ground point. In some cases, the ground points that are extracted may be points that are on or within a threshold distance (e.g., 0.1 meters, 0.25 meters, or other suitable distance) from one or more flat surfaces. For example, LiDAR point 211 may be on a flat surface outside the road 202, and thus, may be an extracted ground point. In some aspects, the LiDAR point cloud may be processed to remove any points on vehicles (e.g., vehicle 206) that are captured by the LiDAR sensor, and any remaining points may be the extracted ground points. For example, instead of using all the points of the LiDAR points cloud, at least a portion of LiDAR points that represent objects occluding view of the road may be removed, and the remaining points may be used as ground points for lane estimation. By extracting the ground points, subsequent processing steps may be performed more efficiently as any occlusions may be avoided by selecting a subset of the LiDAR point cloud.

At block 120, the lane estimation system may aggregate ground points over time. For example, ground points from different LiDAR inputs captured at different times may be aggregated. Aggregating ground points over time provides more information (e.g., a more dense image) to be used for lane estimation, increasing the accuracy of the lane estimation technique.

The lane-boundary detection technique provided herein uses a global positioning system (GPS) and inertial measurement unit (IMU) navigation data. The GPS and IMU data may be of sufficient quality to provide an earth relative 6-degree of freedom (DOF) pose estimate. 6D pose estimation is the task of detecting the 6D pose of an object, which includes its location and orientation. In some aspects, the earth relative 6-DOF pose estimate is used to aggregate extracted ground points (e.g., from LiDAR inputs captured at different times). For example, the orientation and location information from the 6-DOF pose estimate may be used to aggregate consecutive LiDAR frames. In some aspects, to perform aggregation of extracted ground points over time, each LiDAR frame initially in the LiDAR sensor coordinates is transformed to world coordinates (e.g., latitude and longitude) using the orientation and location information of the LiDAR sensor as provided by the 6-DOF pose estimate. In some cases, after transforming the extracted ground points to the world coordinated, the ground points are concatenated and converted back to the LiDAR coordinates.

The aggregation of extracted points may be causal for on-board (e.g., live or online) implementations or non-causal for off-board (e.g., offline) implementations. For example, for on-board implementations, the lane estimation may be performed at or near time t, and may aggregate ground points obtained before time t. For the off-board implementation, the lane estimation may be performed for time t and based on an aggregation of ground points obtained before and after time t.

At block 130, the ground points (e.g., aggregated ground points) may be projected on a birds-eye-view (BEV) frame. This projection is used to reduce the dimensionality of the point cloud (e.g., extracted ground points) since objects of interest may be on the same ground plane in the context of autonomous driving. In addition, the projection of the ground points on the BEV frame maintains a metric space (e.g., a function of the distance between points), allowing the network to exploit priors about the physical dimensions of objects.

To perform the projection, the BEV may be segregated into regions (e.g., 30 cm longitudinal and 4 cm lateral regions). The ground points may then be quantized. For example, the extracted points may be mapped to the regions on the BEV frame, and specific features associated with the points mapped to each region may be calculated. The extracted features from the BEV frame may be a representative intensity (e.g., an average intensity), a maximum intensity, a representative height (e.g., an average height), a maximum height, a normalized density of the points falling in each region of the BEV frame, any combination thereof, and/or other features, as described in more detail herein.

Figure 3:
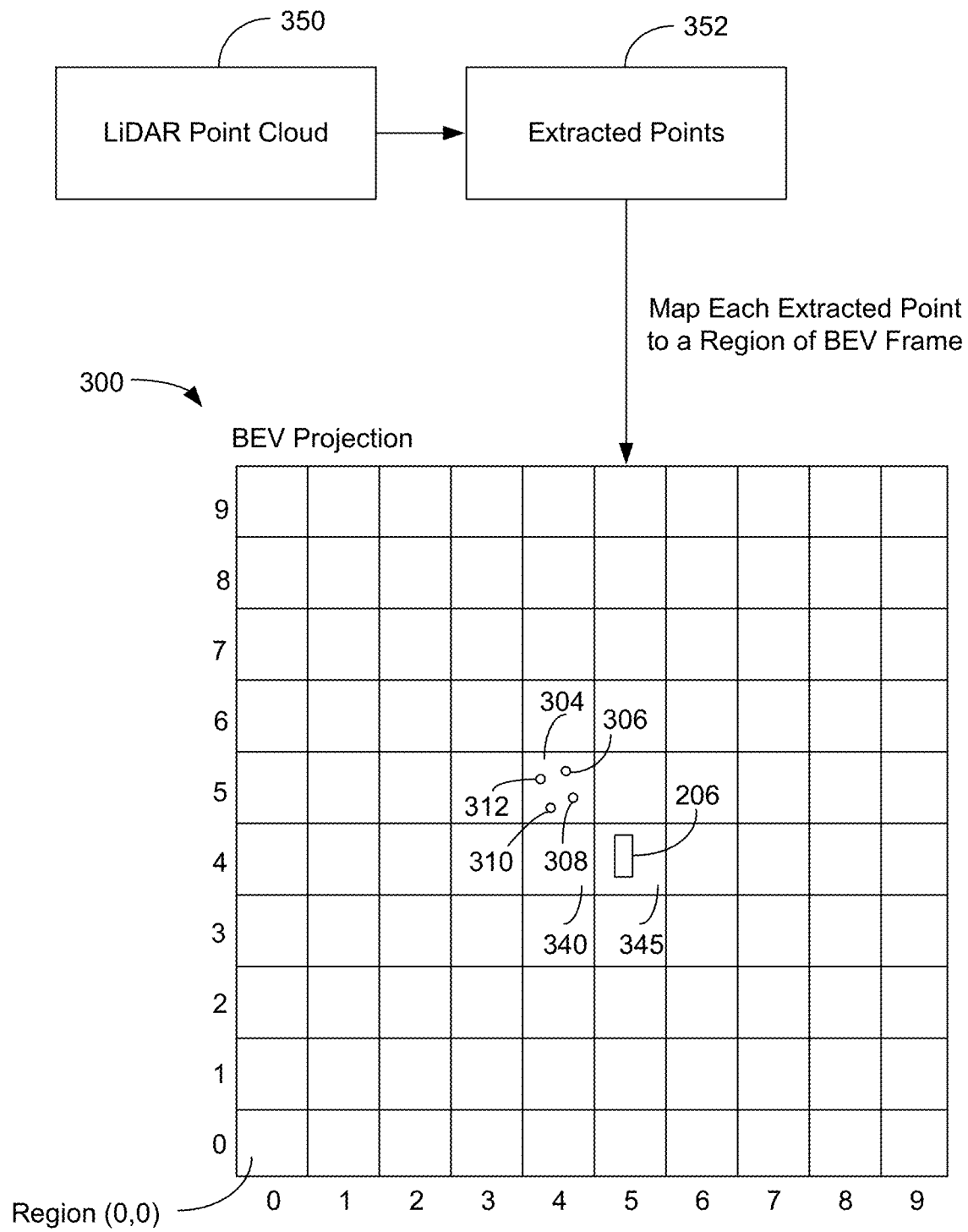
FIG. 3 illustrates a birds-eye-view frame segregated into regions, in accordance with certain aspects of the present disclosure.

FIG. 3 illustrates a BEV frame segregated into regions 300 (also referred to as cells), in accordance with certain aspects of the present disclosure. As shown, the vehicle 206 may be in region 345 of the BEV frame. A lane estimation system may determine which of regions 300 include a lane marking, and in some aspects, a type of the lane marking.

From the LiDAR point cloud 350, a subset of points may be extracted to generate extracted points 352, as described. Each of the extracted ground points 352 may be processed and mapped to a region of the BEV frame such that each of one or more of the regions 300 includes one or more extracted points. In some cases, some of the regions 300 may be mapped to extracted ground points, while some (e.g., at least one region) may not be mapped to any ground points. For instance, extracted points 306, 308, 310, 312 may be mapped to region 304, as shown. For each of the regions 300, various features may be calculated. In one illustrative example, such features may include a representative height (e.g., an average height or other representative height) associated with the points in the region, a maximum height of the points in the region, a representative intensity such as an average intensity (e.g., average reflectivity of the points mapped to the region) or other representative intensity, a maximum intensity (e.g., maximum reflectivity of the points mapped to the region), a number of points in the region (e.g., a normalized density of points falling in each region), or any combination thereof. For instance, with respect to region 304, an average height associated with points 306, 308, 310, 312 may be a feature. A maximum height associated with points 306, 308, 310, 312 may be an additional or alternative feature (e.g., the height of one of the points 306, 308, 310, 312 have the greatest height). An average intensity associated with points 306, 308, 310, 312 may be an additional or alternative feature. A maximum intensity associated with points 306, 308, 310, 312 may be an additional or alternative feature (e.g., the intensity of one of the points 306, 308, 310, 312 having the greatest intensity). The quantity of points mapped to region 304 may be another example feature.

Referring back to FIG. 1B, at block 140, the features of the regions of the BEV frame are provided to a machine learning model for performing lane boundary estimation. For example, the features of the regions may represent five channels (e.g., one channel for each of average height, maximum height, average intensity, maximum intensity, and density) for the machine learning model to perform lane estimation.

Given the features from the BEV frame, dense lane marking vertices along with their attributes may be estimated using any suitable neural network, such as a row-wise classification network. Various attributes associated with lane marking may be estimated via the machine learning model. Such attributes may include lane ID and lane marking types (e.g., long-dashed lane, solid lane, short-dashed lane). For example, the machine learning model may indicate that a lane exists for region 304 and region 340 of FIG. 3. In some aspects, a classification-based network may be used for estimating the dense vertices of the lane markings. However, any suitable regression network can be employed to perform lane estimation. The third dimension (e.g., the z dimension or the height value) of the estimated lane marking vertices may be directly extracted from the average-height feature channel in the associated input data at the estimated x-y location output from the machine learning model. In some aspects, the neural network of the machine learning model may be implemented with an extra output layer to estimate the height associated with the lane marking vertices from the given input data.

In some cases, a regression network employed for camera-based lane-boundary estimation may be used. For example, the regression network for camera-based lane-boundary estimation may be used to process two-dimensional data. The regression network may be implemented with a modified input layer to process data associated with extra feature channels (e.g., average height and maximum height).

In some aspects, the machine learning model may be trained using an objective function. For example, candidate solutions may be provided to the model and evaluated against training datasets. An error score (also referred to as a loss of the model) may be calculated by comparing the solution with the training dataset. The machine learning model may be trained to minimize the error score. For example, the machine learning model may be trained by receiving training data sets such as representative height (e.g., average height), maximum height, representative intensity (e.g., average intensity), maximum intensity, and density associated with each of regions of a BEV frame along with the candidate solutions (e.g., lane identification such as a lane boundary and type), based on which the machine learning model may be trained by adjusting model weights. The process of training a machine learning model is described in more detail herein with respect to FIGS. 5-6.

Once one or more road lanes are identified, the identified road lanes may be used to facilitate various operations associated with autonomous tasks. For example, the identified lanes may be used by a device to localize a device's location (e.g., a vehicle location) on a map. As another example, a vehicle may perform path planning operations using the identified lanes. In some illustrative examples, the path planning operations may include a vehicle planning to merge from one traffic lane or stream to another traffic lane or stream, maintaining a lane while driving, changing lanes, automatically breaking or stopping (e.g., based on a determination that a lane is ending and one or more vehicles or other objects are occupying other nearby lanes), considering vehicles in opposing or other lanes, among others.

Figure 4:
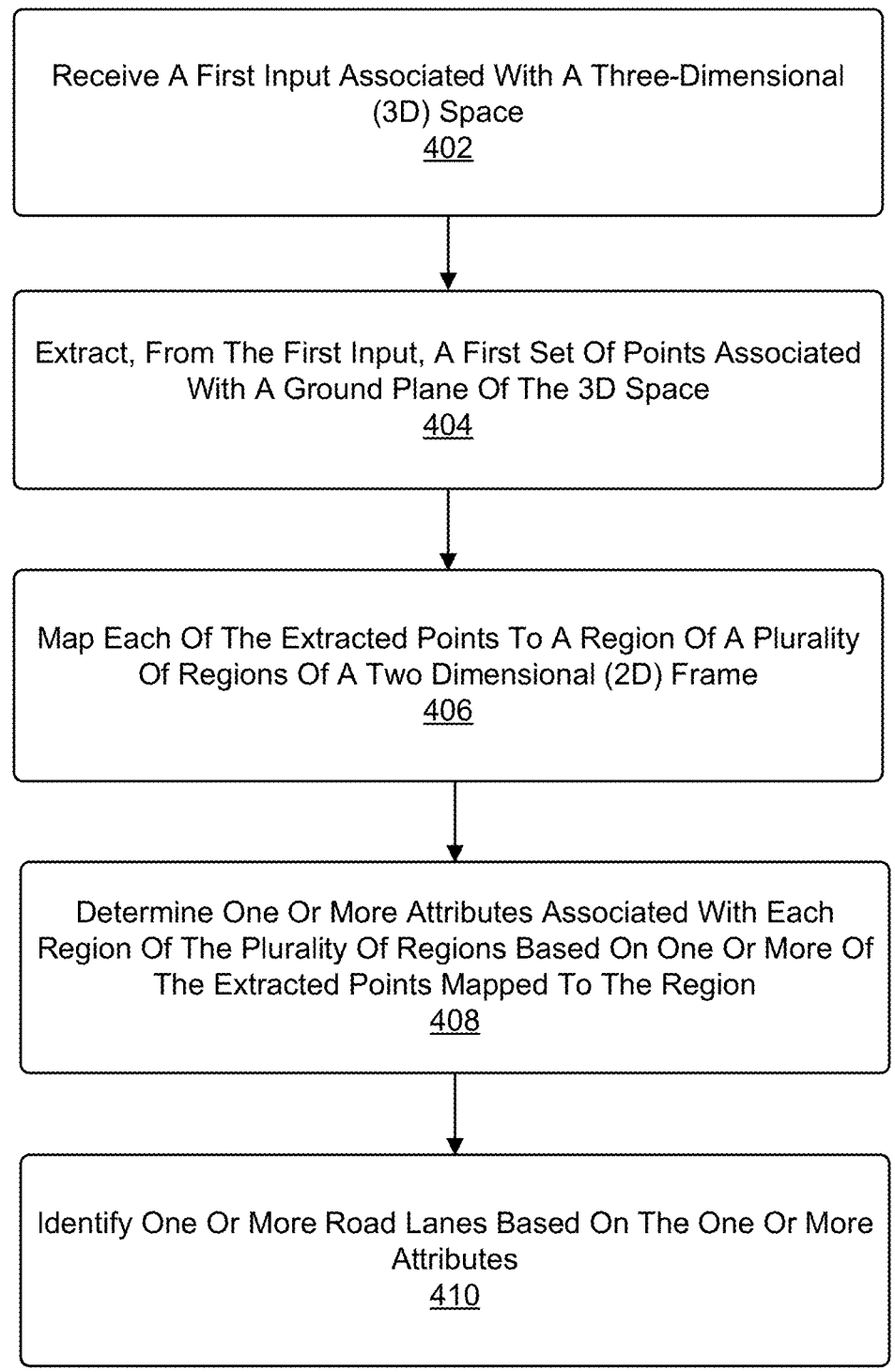
FIG. 4 is a flow diagram illustrating an example process for lane estimation, in accordance with certain aspects of the present disclosure.

FIG. 4 is a flow diagram illustrating an example process 400 for lane estimation. The operations of process 400 may be performed by a lane estimation system, such as the processor 710, and in some aspects, the storage device 730. In some cases, the lane estimation system may be part of a vehicle.

At block 402, the lane estimation system receives a first input (e.g., any light-based input such as a LiDAR point cloud or frame received from a sensor) associated with a 3D space. For example, the first input may be received from one or more sensors of a vehicle. In some examples, the first input includes a LiDAR point cloud received from one or more LiDAR sensors of the vehicle.

At block 404, the lane estimation system extracts, from the first input (e.g., from the first LiDAR point cloud, such as LiDAR point cloud 350), a first set of points associated with a ground plane of the 3D space. For example, extracting the first set of points associated with the ground plane may involve selecting a subset of points of the first input (e.g., a subset of points from the first LiDAR point cloud), where the subset of points include points that are on or within a threshold distance (e.g., 0.1 meters, 0.25 meters, 0.5 meters, or other suitable distance) from a flat surface. In some aspects, the first set of points includes one or more points of the first input (e.g., one or more points of the first LiDAR point cloud) that are on the ground plane. In some aspects, extracting the first set of points associated with the ground plane may involve excluding one or more points of the first input (e.g., one or more points of the first LiDAR point cloud) that are on one or more objects (e.g., another vehicle occluding view of the road). In some aspects, the lane estimation system may extract the first set of points based on GPS or IMU data.

At block 406, the lane estimation system maps each of the first set of points to a region of a plurality of regions (e.g., region 300) of a two-dimensional frame, such as a BEV frame. In some aspects, the lane estimation system may also receive a second input (e.g., a second LiDAR point cloud) associated with the 3D space, extract, from the second input (e.g., the second LiDAR point cloud), a second set of points associated with the ground plane of the 3D space, and aggregate the first set of points and the second set of points to generate aggregated points. In this case, mapping each of the first set of points at block 406 may involve mapping each of the aggregated points to the one of the plurality of regions.

At block 408, the lane estimation system determines (e.g., calculates) one or more attributes associated with each region of the plurality of regions based on one or more of the first set of points mapped to the region. The one or more attributes may include at least one of a representative height (e.g., an average height) associated with the one or more of the first set of points mapped to the region, maximum height associated with the one or more of the first set of points mapped to the region, a representative intensity (e.g., an average intensity) associated with the one or more of the first set of points mapped to the region, a maximum intensity associated with the one or more of the first set of points mapped to the region, and a quantity of the one or more of the first set of points mapped to the region.

At block 410, the lane estimation system identifies one or more road lanes based on the one or more attributes. For example, identifying the one or more road lanes may involve analyzing the one or more attributes using a machine learning model. The machine learning model may include a row-wise machine learning model or a classification neural network. In some aspects, identifying the one or more road lanes may involve identifying a type of each of one or more road lanes (e.g., whether each lane is a solid line or dashed line).

In some aspects, the lane estimation system localizes a location of the apparatus on a map based on the one or more road lanes. In some aspects, the lane estimation system may perform a path finding operation based on the one or more road lanes.

Figure 5:
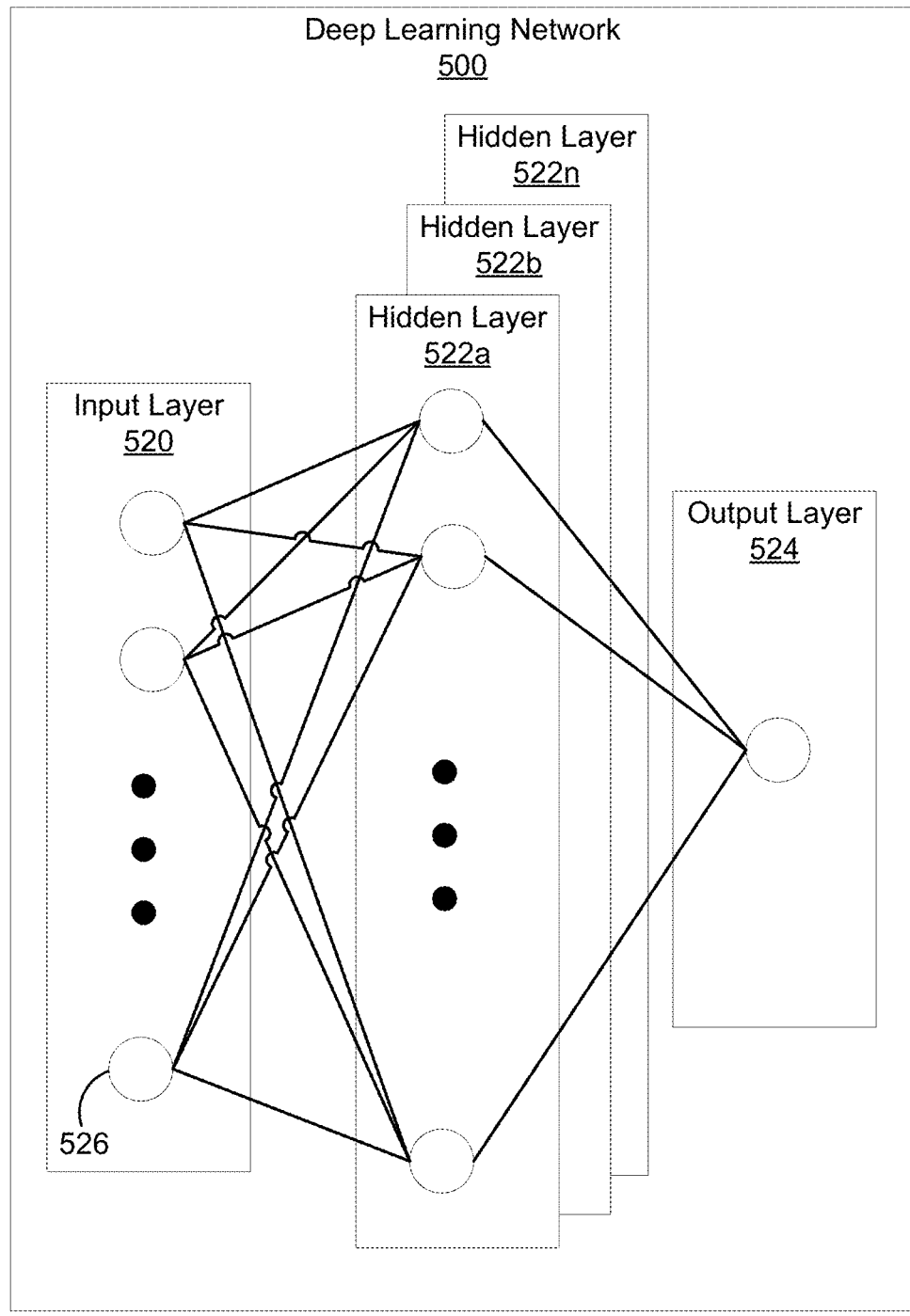
FIG. 5 is a block diagram illustrating an example of a deep learning network, in accordance with some examples.

FIG. 5 is an illustrative example of a deep learning neural network 500 that can be used by the lane estimation system. An input layer 520 includes input data. In one illustrative example, the input layer 520 can include data representing the pixels of an input image or video frame. The neural network 500 includes multiple hidden layers 522a, 522b, through 522n. The hidden layers 522a, 522b, through 522n include "n" number of hidden layers, where "n" is an integer greater than or equal to one. The number of hidden layers can be made to include as many layers as needed for the given application. The neural network 500 further includes an output layer 524 that provides an output resulting from the processing performed by the hidden layers 522a, 522b, through 522n. In one illustrative example, the output layer 524 can provide a classification for an object in an input image or video frame. The classification can include a class identifying the type of lane (e.g., a static object, a vehicle, a person, a dog, a cat, or other object).

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the hidden layers 522a, 522b, through 522n can transform the information of each input node by applying activation functions to these information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 524, at which an output is provided. In some cases, while nodes (e.g., node 526) in the neural network 500 are shown as having multiple output lines, a node has a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522a, 522b, through 522n in order to provide the output through the output layer 524. In an example in which the neural network 500 is used to identify objects in images, the neural network 500 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 500 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 500 is trained well enough so that the weights of the layers are accurately tuned.

For the example of identifying lanes, the forward pass can include passing a training features (e.g., average height, maximum height, average intensity, maximum intensity, and density) through the neural network 500. The weights are initially randomized before the neural network 500 is trained. The training features may include a representative height (e.g., average height), maximum height, a representative intensity (e.g., average intensity), maximum intensity, and density, as described.

For a first training iteration for the neural network 500, the output will likely include values that do not give preference to any particular class due to the weights being randomly selected at initialization. For example, if the output is a vector with probabilities that the lane includes different types, the probability value for each of the different types may be equal or at least very similar (e.g., for ten possible classes, each class may have a probability value of 0.1). With the initial weights, the neural network 500 is unable to determine low level features and thus cannot make an accurate determination of what the classification (e.g., type) of the lane might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 500 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 500 can include any suitable deep network. One example includes a convolutional neural network (CNN), which includes an input layer and an output layer, with multiple hidden layers between the input and out layers. An example of a CNN is described below with respect to FIG. 6. The hidden layers of a CNN include a series of convolutional, nonlinear, pooling (for downsampling), and fully connected layers. The neural network 500 can include any other deep network other than a CNN, such as an autoencoder, a deep belief nets (DBNs), a Recurrent Neural Networks (RNNs), among others.

Figure 6:
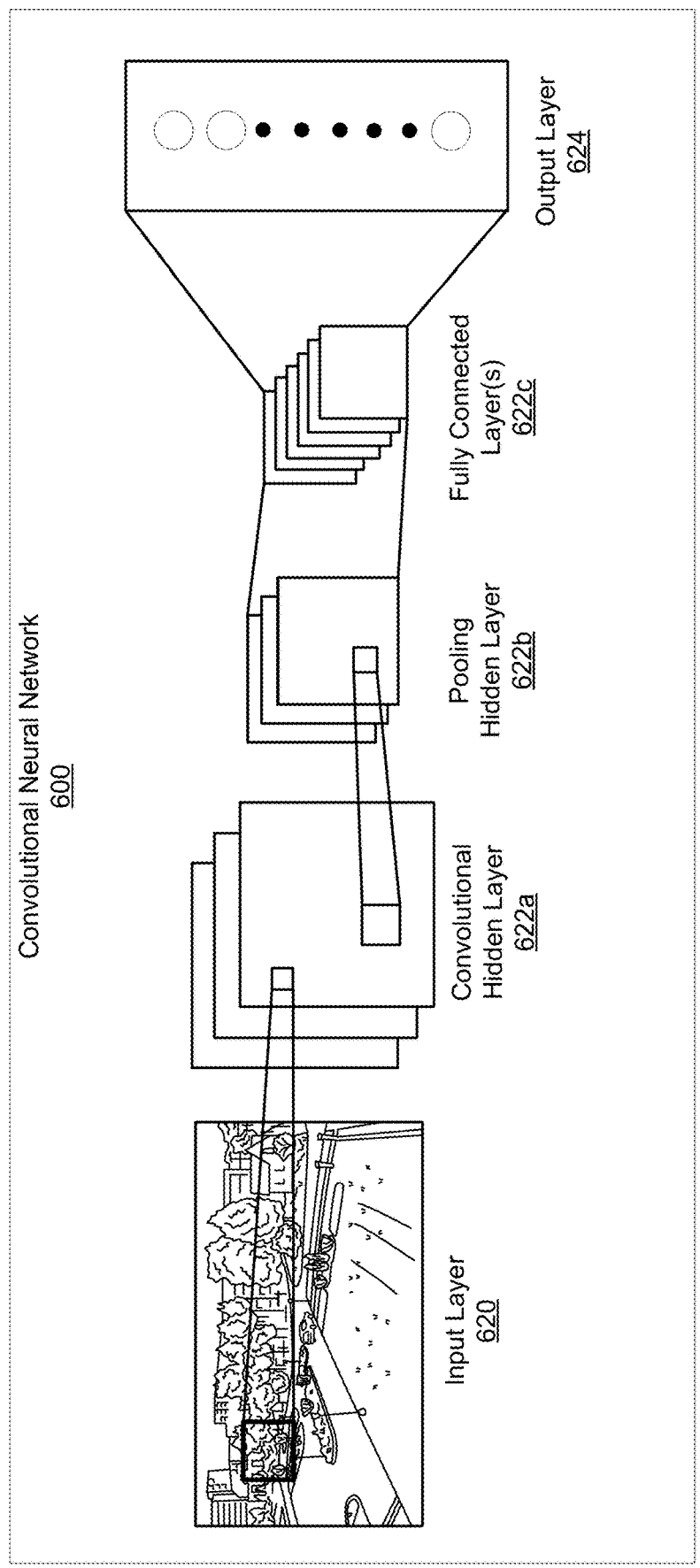
FIG. 6 is a block diagram illustrating an example of a convolutional neural network, in accordance with some examples.

FIG. 6 is an illustrative example of a convolutional neural network 600 (CNN 600). The input layer 620 of the CNN 600 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 622a, an optional non-linear activation layer, a pooling hidden layer 622b, and fully connected hidden layers 622c to get an output at the output layer 624. While only one of each hidden layer is shown in FIG. 6, one of ordinary skill will appreciate that multiple convolutional hidden layers, non-linear layers, pooling hidden layers, and/or fully connected layers can be included in the CNN 600. As previously described, the output can indicate a single class of an object (e.g., lane) or can include a probability of classes that best describe the object in the image.

The first layer of the CNN 600 is the convolutional hidden layer 622a. The convolutional hidden layer 622a analyzes the image data of the input layer 620. Each node of the convolutional hidden layer 622a is connected to a region of nodes (pixels) of the input image called a receptive field. The convolutional hidden layer 622a can be considered as one or more filters (each filter corresponding to a different activation or feature map), with each convolutional iteration of a filter being a node or neuron of the convolutional hidden layer 622a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 622a. Each connection between anode and a receptive field for that node learns a weight and, in some cases, an overall bias such that each node learns to analyze its particular local receptive field in the input image. Each node of the hidden layer 622a will have the same weights and bias (called a shared weight and a shared bias). For example, the filter has an array of weights (numbers) and the same depth as the input. A filter will have a depth of 3 for the image or video frame example (according to three color components of the input image). An illustrative example size of the filter array is 5×5×3, corresponding to a size of the receptive field of a node.

The convolutional nature of the convolutional hidden layer 622a is due to each node of the convolutional layer being applied to its corresponding receptive field. For example, a filter of the convolutional hidden layer 622a can begin in the top-left corner of the input image array and can convolve around the input image. As noted above, each convolutional iteration of the filter can be considered a node or neuron of the convolutional hidden layer 622a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 622a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 622a.

The mapping from the input layer to the convolutional hidden layer 622a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 622a can include several activation maps in order to identify multiple features in an image. The example shown in FIG. 6 includes three activation maps. Using three activation maps, the convolutional hidden layer 622a can detect three different kinds of features, with each feature being detectable across the entire image.

In some examples, a non-linear hidden layer can be applied after the convolutional hidden layer 622a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 600 without affecting the receptive fields of the convolutional hidden layer 622a.

The pooling hidden layer 622b can be applied after the convolutional hidden layer 622a (and after the non-linear hidden layer when used). The pooling hidden layer 622b is used to simplify the information in the output from the convolutional hidden layer 622a. For example, the pooling hidden layer 622b can take each activation map output from the convolutional hidden layer 622a and generates a condensed activation map (or feature map) using a pooling function. Max-pooling is one example of a function performed by a pooling hidden layer. Other forms of pooling functions be used by the pooling hidden layer 622a, such as average pooling, L2-norm pooling, or other suitable pooling functions. A pooling function (e.g., a max-pooling filter, an L2-norm filter, or other suitable pooling filter) is applied to each activation map included in the convolutional hidden layer 622a. In the example shown in FIG. 6, three pooling filters are used for the three activation maps in the convolutional hidden layer 622a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 622a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 622a having a dimension of 24×24 nodes, the output from the pooling hidden layer 622b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 600.

The final layer of connections in the network is a fully-connected layer that connects every node from the pooling hidden layer 622b to every one of the output nodes in the output layer 624. Using the example above, the input layer includes 28×28 nodes encoding the pixel intensities of the input image, the convolutional hidden layer 622a includes 3×24×24 hidden feature nodes based on application of a 5×5 local receptive field (for the filters) to three activation maps, and the pooling layer 622b includes a layer of 3×12×12 hidden feature nodes based on application of max-pooling filter to 2×2 regions across each of the three feature maps. Extending this example, the output layer 624 can include ten output nodes. In such an example, every node of the 3×12×12 pooling hidden layer 622b is connected to every node of the output layer 624.

The fully connected layer 622c can obtain the output of the previous pooling layer 622b (which should represent the activation maps of high-level features) and determines the features that most correlate to a particular class. For example, the fully connected layer 622c layer can determine the high-level features that most strongly correlate to a particular class, and can include weights (nodes) for the high-level features. A product can be computed between the weights of the fully connected layer 622c and the pooling hidden layer 622b to obtain probabilities for the different classes. For example, if the CNN 600 is being used to predict that an object in an image or video frame is a vehicle, high values will be present in the activation maps that represent high-level features of vehicles (e.g., two or four tires, a windshield, side view mirrors, etc.).

In some examples, the output from the output layer 624 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a person), an 80% probability that the image is the fourth class of object (e.g., a static object on a road or other driving surface), and a 15% probability that the image is the sixth class of object (e.g., a vehicle). The probability for a class can be considered a confidence level that the object is part of that class.

Figure 7:
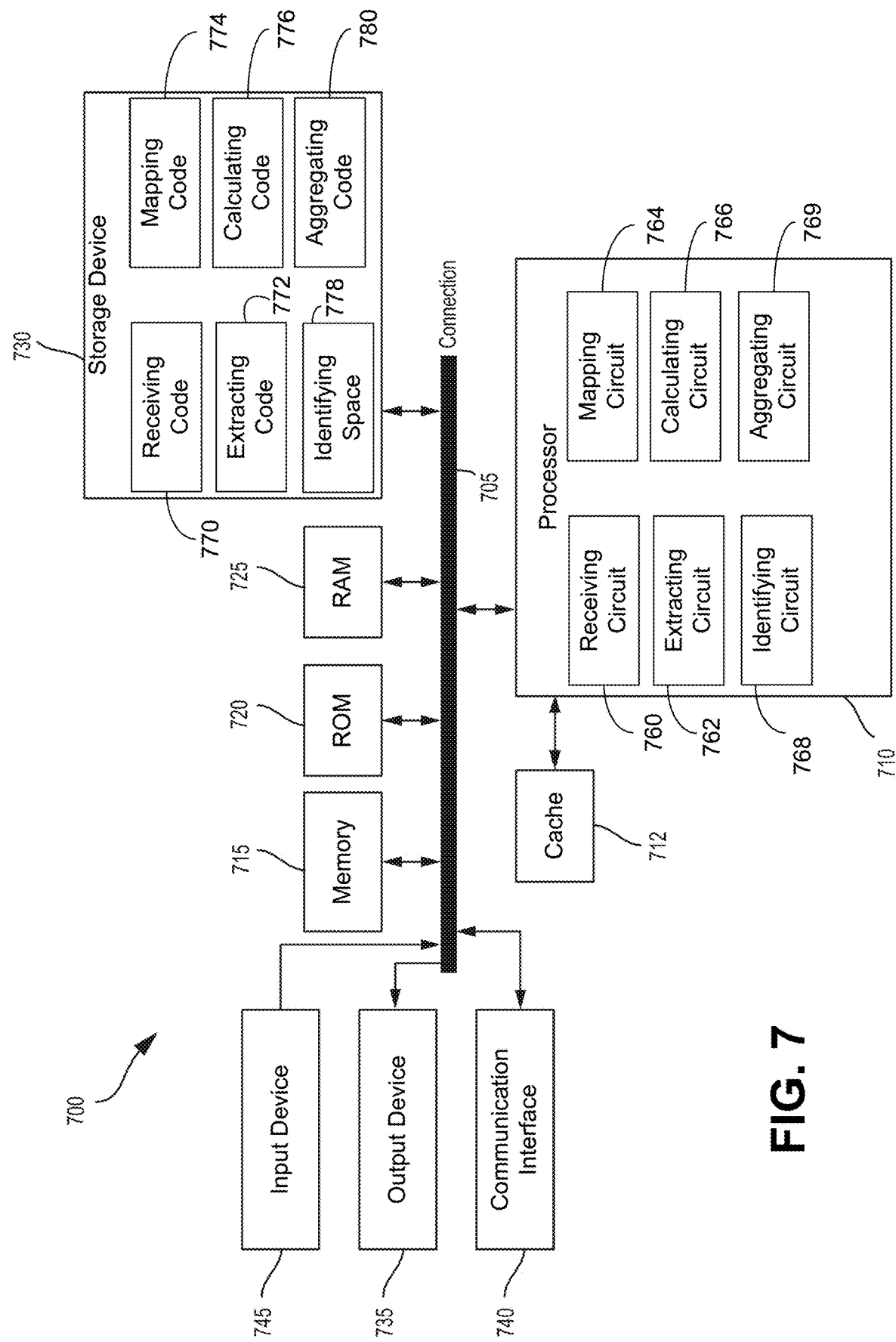
FIG. 7 is a block diagram of an exemplary computing device that may be used to implement some aspects of the technology described herein, in accordance with some examples.

FIG. 7 is a diagram illustrating an example of a system for implementing certain aspects of the present technology. In particular, FIG. 7 illustrates an example of computing system 700, which can be for example any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some aspects, computing system 700 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service. In some aspects, code stored in storage device 730 may be configured to control processor 710 to perform operations described herein. In some aspects, the processor 710 may be a special-purpose processor where instructions or circuitry are incorporated into the actual processor design to perform the operations described herein. Processor 710 may essentially be a completely self-contained computing system, containing multiple cores or processors, a bus, memory controller, cache, etc. A multi-core processor may be symmetric or asymmetric. For example, the processor 710 may include circuit 760 for receiving (e.g., receiving a LiDAR point cloud), circuit 762 for extracting (e.g., extracting points from the LiDAR point cloud), circuit 764 for mapping (e.g., mapping of extracted points to regions of BEV frame), circuit 766 for calculating (e.g., calculating attributes associated with regions of the BEV frame), and circuit 768 for identifying (e.g., identifying a road lane). In some aspects, the processor 710 also optionally includes circuit 769 for aggregating.

The storage device 730 may store code which, when executed by the processors 710, performs the operations described herein. For example, the storage device 730 may include code 770 for receiving (e.g., receiving a LiDAR point cloud), code 772 for extracting (e.g., extracting points from the LiDAR point cloud), code 774 for mapping (e.g., mapping of extracted points to regions of BEV frame), code 776 for calculating (e.g., calculating attributes associated with regions of the BEV frame), and code 778 for identifying (e.g., identifying a road lane). In some aspects, the storage device 730 may include code 780 for aggregating.

To enable user interaction, computing system 700 includes an input device 745, which can represent any number of input mechanisms, such as a microphone for speech, a camera for generating images or video, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some aspects, a hardware service that performs a particular function can include the software component stored in a computer-readable medium in connection with the necessary hardware components, such as processor 710, connection 705, output device 735, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus for lane estimation, comprising: at least one memory; and at least one processor coupled to the at least one memory and configured to: receive a first input associated with a three-dimensional (3D) space; extract, from the first input, a first set of points associated with a ground plane of the 3D space; map each of the first set of points to a region of a plurality of regions of a two-dimensional (2D) frame; determine one or more attributes associated with each region of the plurality of regions based on one or more of the first set of points mapped to the region; and identify one or more road lanes based on the one or more attributes.

Aspect 2: The apparatus of Aspect 1, wherein the first input includes a light-based input.

Aspect 3: The apparatus of Aspect 2, wherein the light-based input comprises a light detection and ranging (LiDAR) point cloud.

Aspect 4: The apparatus of any of Aspects 1 to 3, wherein the 2D frame includes a birds-eye-view (BEV) frame.

Aspect 5: The apparatus of any of Aspects 1 to 4, wherein, to identify the one or more road lanes, the at least one processor is configured to analyze the one or more attributes using a machine learning model.

Aspect 6: The apparatus of Aspect 5, wherein the machine learning model comprises a row-wise classification machine learning model.

Aspect 7: The apparatus of any of Aspects 5 or 6, wherein the machine learning model comprises a classification neural network.

Aspect 8: The apparatus of any of Aspects 1 to 7, wherein, to identify the one or more road lanes, the at least one processor is configured to identify a type of each of one or more road lanes.

Aspect 9: The apparatus of any of Aspects 1 to 8, wherein the at least one processor is further configured to: receive a second input associated with the 3D space; extract, from the second input, a second set of points associated with the ground plane of the 3D space; and aggregate the first set of points and the second set of points to generate aggregated points, wherein, to map each of the first set of points, the at least one processor is configured to map each of the aggregated points to the one of the plurality of regions.

Aspect 10: The apparatus of Aspect 9, wherein the first input includes a first light detection and ranging (LiDAR) point cloud and wherein the second input includes a second LiDAR point cloud.

Aspect 11: The apparatus of any of Aspects 1 to 10, wherein the one or more attributes include at least one of: a representative height associated with the one or more of the first set of points mapped to the region; maximum height associated with the one or more of the first set of points mapped to the region; a representative intensity associated with the one or more of the first set of points mapped to the region; a maximum intensity associated with the one or more of the first set of points mapped to the region; and a quantity of the one or more of the first set of points mapped to the region.

Aspect 12: The apparatus of any of Aspects 1 to 11, wherein, to extract the first set of points associated with the ground plane, the at least one processor is configured to select a subset of points of the first input that are on or within a threshold distance from a flat surface.

Aspect 13: The apparatus of any of Aspects 1 to 12, wherein the first set of points include one or more points of the first input that are on or within a threshold distance from the ground plane.

Aspect 14: The apparatus of any of Aspects 1 to 13, wherein, to extract the first set of points associated with the ground plane, the at least one processor is configured to exclude one or more points of the first input that are on one or more objects.

Aspect 15: The apparatus of Aspect 14, wherein the one or more objects include a vehicle.

Aspect 16: The apparatus of any of Aspects 1 to 15, wherein the at least one processor is configured to extract the first set of points based on at least one of global positioning system (GPS) or inertial measurement unit (IMU) data.

Aspect 17: The apparatus of any of Aspects 1 to 16, wherein the apparatus is included as part of a vehicle.

Aspect 18: The apparatus of any of Aspects 1 to 17, wherein the at least one processor is further configured to localize a location of the apparatus on a map based on the one or more road lanes.

Aspect 19: The apparatus of any of Aspects 1 to 18, wherein the at least one processor is further configured to perform a path planning operation based on the one or more road lanes.

Aspect 20: A method for lane estimation, comprising: receiving a first input associated with a three-dimensional (3D) space; extracting, from the first input, a first set of points associated with a ground plane of the 3D space; mapping each of the first set of points to a region of a plurality of regions of a two-dimensional (2D) frame; determining one or more attributes associated with each region of the plurality of regions based on one or more of the first set of points mapped to the region; and identifying one or more road lanes based on the one or more attributes.

Aspect 21: The method of Aspect 20, wherein the first input includes a light-based input.

Aspect 22: The method of Aspect 21, wherein the light-based input comprises a light detection and ranging (LiDAR) point cloud.

Aspect 23: The method of any of Aspects 20 to 22, wherein the 2D frame includes a birds-eye-view (BEV) frame.

Aspect 24: The method of any of Aspects 20 to 23, wherein identifying the one or more road lanes comprises analyzing the one or more attributes using a machine learning model.

Aspect 25: The method of Aspect 24, wherein the machine learning model comprises a row-wise classification machine learning model.

Aspect 26: The method of any of Aspects 24 or 25, wherein the machine learning model comprises a classification neural network.

Aspect 27: The method of any of Aspects 20 to 26, wherein identifying the one or more road lanes comprises identifying a type of each of one or more road lanes.

Aspect 28: The method of any of Aspects 20 to 27, further comprising: receiving a second input associated with the 3D space; extracting, from the second input, a second set of points associated with the ground plane of the 3D space; and aggregating the first set of points and the second set of points to generate aggregated points, wherein mapping each of the first set of points comprises mapping each of the aggregated points to the one of the plurality of regions.

Aspect 29: The apparatus of Aspect 28, wherein the first input includes a first light detection and ranging (LiDAR) point cloud and wherein the second input includes a second LiDAR point cloud.

Aspect 30: The method of any of Aspects 20 to 29, wherein the one or more attributes include at least one of: a representative height associated with the one or more of the first set of points mapped to the region; maximum height associated with the one or more of the first set of points mapped to the region; a representative intensity associated with the one or more of the first set of points mapped to the region; a maximum intensity associated with the one or more of the first set of points mapped to the region; and a quantity of the one or more of the first set of points mapped to the region.

Aspect 31: The method of any of Aspects 20 to 30, wherein extracting the first set of points associated with the ground plane comprises selecting a subset of points of the first input that are on or within a threshold distance from a flat surface.

Aspect 32: The method of any of Aspects 20 to 31, wherein the first set of points include one or more points of the first input that are on or within a threshold distance from the ground plane.

Aspect 33: The method of any of Aspects 20 to 32, wherein extracting the first set of points associated with the ground plane comprises excluding one or more points of the first input that are on one or more objects.

Aspect 34: The method of Aspect 33, wherein the one or more objects include a vehicle.

Aspect 35: The method of any of Aspects 20 to 34, wherein extracting the first set of points is based on at least one of global positioning system (GPS) or inertial measurement unit (IMU) data.

Aspect 36: The method of any of Aspects 20 to 35, wherein the method is performed by an apparatus included as part of a vehicle.

Aspect 37: The method of any of Aspects 20 to 36, further comprising localizing a location of the apparatus on a map based on the one or more road lanes.

Aspect 38: The method of any of Aspects 20 to 37, further comprising performing a path finding operation based on the one or more road lanes.

Aspect 39. A non-transitory computer-readable medium having stored thereon instructions that, when executed by one or more processors, cause the one or more processors to perform operations according to any of Aspects 1 to 38.

Aspect 40: An apparatus for image processing, the apparatus comprising one or more means for performing operations according to any of Aspects 1 to 38.

What is claimed is:

1. An apparatus for lane estimation, comprising:
   at least one memory; and
   at least one processor coupled to the at least one memory and configured to:
   receive a first input three-dimensional (3D) point cloud associated with a 3D space;
   extract, from the first input 3D point cloud, a first set of 3D points associated with a ground plane of the 3D space;
   map a plurality of 3D points of the extracted first set of 3D points to a region of a plurality of regions of a two-dimensional (2D) frame, wherein each region of the plurality of regions of the 2D frame correspond to a respective portion of the 3D space associated with the ground plane;
determine a combination of features for a region of the plurality of regions based on features of the plurality of 3D points mapped to the region, wherein the features include at least a height and an intensity of a first 3D point mapped to the region and a height and an intensity of a second 3D point mapped to the region;
determine one or more representative features for the region based on the combination of features determined for the region, wherein the one or more representative features determined for the region include at least a representative height for the region based on a plurality of heights associated with the plurality of 3D points mapped to the region and a representative intensity for the region based on a plurality of intensities associated with the plurality of 3D points mapped to the region; and
process the one or more representative features determined for the region using a machine learning model to determine one or more attributes of one or more road lanes, wherein the machine learning model is trained using a training set including at least representative height data and representative intensity data of one or more 3D spaces.

2. The apparatus of claim 1, wherein the first input 3D point cloud includes a light-based input.

3. The apparatus of claim 2, wherein the light-based input comprises a light detection and ranging (LiDAR) point cloud.

4. The apparatus of claim 1, wherein the 2D frame includes a birds-eye-view (BEV) frame.

5. The apparatus of claim 1, wherein the one or more attributes of the one or more road lanes comprise at least one of an indication that the region includes the one or more road lanes, a lane identifier, or a lane marking type.

6. The apparatus of claim 1, wherein the machine learning model comprises at least one of a row-wise classification machine learning model or a classification neural network.

7. The apparatus of claim 1, wherein the at least one processor is configured to identify a type of each of one or more road lanes.

8. The apparatus of claim 1, wherein the at least one processor is configured to:
receive a second input 3D point cloud associated with the 3D space;
extract, from the second input 3D point cloud, a second set of 3D points associated with the ground plane of the 3D space; and
aggregate the extracted first set of 3D points and the extracted second set of 3D points to generate aggregated points, wherein, to map each 3D point of the extracted first set of 3D points, the at least one processor is configured to map each point of the aggregated points to a respective region of the plurality of regions.

9. The apparatus of claim 8, wherein the first input 3D point cloud includes a first light detection and ranging (LiDAR) point cloud and wherein the second input 3D point cloud includes a second LiDAR point cloud.

10. The apparatus of claim 1, wherein the one or more representative features further include at least one of a:
a maximum height for the region based on the plurality of heights associated with the plurality of 3D points mapped to the region; and
a maximum intensity for the region based on the plurality of intensities associated with the plurality of 3D points mapped to the region.

11. The apparatus of claim 1, wherein, to extract the first set of 3D points associated with the ground plane, the at least one processor is configured to select a subset of 3D points of the first input 3D point cloud that are on or within a threshold distance from a flat surface.

12. The apparatus of claim 1, wherein the extracted first set of 3D points include one or more 3D points of the first input 3D point cloud that are on or within a threshold distance from the ground plane.

13. The apparatus of claim 1, wherein, to extract the first set of 3D points associated with the ground plane, the at least one processor is configured to exclude one or more 3D points of the first input 3D point cloud that are on one or more objects.

14. The apparatus of claim 13, wherein the one or more objects include a vehicle.

15. The apparatus of claim 1, wherein the at least one processor is configured to extract the first set of 3D points based on at least one of global positioning system (GPS) or inertial measurement unit (IMU) data.

16. The apparatus of claim 1, wherein the apparatus is included as part of a vehicle.

17. The apparatus of claim 1, wherein the at least one processor is further configured to localize a location of the apparatus on a map based on the one or more road lanes.

18. The apparatus of claim 1, wherein the at least one processor is further configured to perform a path planning operation based on the one or more road lanes.

19. A method for lane estimation, comprising:
receiving a first input three-dimensional (3D) point cloud associated with a three-dimensional (3D) space;
extracting, from the first input 3D point cloud, a first set of 3D points associated with a ground plane of the 3D space;
mapping a plurality of 3D points of the extracted first set of 3D points to a region of a plurality of regions of a two-dimensional (2D) frame, wherein each region of the plurality of regions of the 2D frame correspond to a respective portion of the 3D space associated with the ground plane;
determining a combination of features for a region of the plurality of regions based on features of the plurality of 3D points mapped to the region, wherein the features include at least a height and an intensity of a first 3D point mapped to the region and a height and an intensity of a second 3D point mapped to the region;
determining one or more representative features for the region based on the combination of features determined for the region, wherein the one or more representative features determined for the region attributes include at least a representative height for the region based on a plurality of heights associated with the plurality of 3D points mapped to the region and a representative intensity for the region based on a plurality of intensities associated with the plurality of 3D points mapped to the region; and
processing the one or more representative features determined for the region using a machine learning model to determine one or more attributes of one or more road lanes, wherein the machine learning model is trained using a training set including at least representative height data and representative intensity data of one or more 3D spaces.

20. The method of claim 19, wherein the first input 3D point cloud includes a light-based input.

21. The method of claim 20, wherein the light-based input comprises a light detection and ranging (LiDAR) point cloud.

22. The method of claim 19, wherein the 2D frame includes a birds-eye-view (BEV) frame.

23. The method of claim 19, wherein the one or more attributes of the one or more road lanes comprise at least one of an indication that the region includes as including the one or more road lanes, a lane identifier, or a lane marking type.

24. The method of claim 19, wherein the machine learning model comprises at least one of a row-wise classification machine learning model or a classification neural.

25. The method of claim 19, further comprising:
receiving a second input 3D point cloud associated with the 3D space;
extracting, from the second input 3D point cloud, a second set of 3D points associated with the ground plane of the 3D space; and
aggregating the extracted first set of 3D points and the extracted second set of 3D points to generate aggregated points, wherein mapping each 3D point of the extracted first set of 3D points comprises mapping each point of the aggregated points to a respective region of the plurality of regions.

26. A non-transitory computer-readable medium having stored thereon instructions that, when executed by one or more processors, cause the one or more processors to:
receive a first input three-dimensional (3D) point cloud associated with a 3D space;
extract, from the first input 3D point cloud, a first set of 3D points associated with a ground plane of the 3D space;
map a plurality of 3D points of the extracted first set of 3D points to a region of a plurality of regions of a two-dimensional (2D) frame, wherein each region of the plurality of regions of the 2D frame correspond to a respective portion of the 3D space associated with the ground plane;
determine a combination of features for a region of the plurality of regions based on features of the plurality of 3D points mapped to the region, wherein the features include at least a height and an intensity of a first 3D point mapped to the region and a height and an intensity of a second 3D point mapped to the region;
determine one or more representative features for the region based on the combination of features determined for the region, wherein the one or more representative features determined for the region include at least a representative height for the region based on a plurality of heights associated with the plurality of 3D points mapped to the region and a representative intensity for the region based on a plurality of intensities associated with the plurality of 3D points mapped to the region; and
process the one or more representative features determined for the region using a machine learning model to determine one or more attributes of one or more road lanes, wherein the machine learning model is trained using a training set including at least representative height data and representative intensity data of one or more 3D spaces.

27. An apparatus for lane estimation, comprising:
means for receiving a first input three-dimensional (3D) point cloud associated with a 3D space;
means for extracting, from the first input 3D point cloud, a first set of 3D points associated with a ground plane of the 3D space;
means for mapping a plurality of 3D points of the extracted first set of 3D points to a region of a plurality of regions of a two-dimensional (2D) frame, wherein each region of the plurality of regions of the 2D frame correspond to a respective portion of the 3D space associated with the ground plane;
means for determining a combination of features for a region of the plurality of regions based on features of the plurality of 3D points mapped to the region, wherein the features include at least a height and an intensity of a first 3D point mapped to the region and a height and an intensity of a second 3D point mapped to the region;
means for determining one or more representative features for the region based on the combination of features determined for the region, wherein the one or more representative features determined for the region include at least a representative height for the region based on a plurality of heights associated with the plurality of 3D points mapped to the region and a representative intensity for the region based on a plurality of intensities associated with the plurality of 3D points mapped to the region; and
means for processing the one or more representative features determined for the region using a machine learning model to determine one or more attributes of one or more road lanes, wherein the machine learning model is trained using a training set including at least representative height data and representative intensity data of one or more 3D spaces.

28. The apparatus of claim 1, wherein the one or more attributes further include a quantity of the plurality of 3D points mapped to the region.

29. The method of claim 19, wherein the one or more representative features further include at least one of a:
a maximum height for the region based on the plurality of heights associated with the plurality of 3D points mapped to the region; and
a maximum intensity for the region based on the plurality of intensities associated with the plurality of 3D points mapped to the region.

30. The method of claim 19, wherein the one or more attributes further include a quantity of the plurality of 3D points mapped to the region.

* * * * *